(12) United States Patent
Van Doorn et al.

(10) Patent No.: US 9,143,424 B2
(45) Date of Patent: Sep. 22, 2015

(54) MONITORING A CONTENT-DELIVERY NETWORK

(75) Inventors: Jan Van Doorn, Castle Rock, CO (US); Joseph Pryszlak, Lafayette Hill, PA (US)

(73) Assignee: Comcast Cable Holdings, LLC, Philadelphia, PA (US)

( * ) Notice: Subject to any disclaimer, the term of this patent is extended or adjusted under 35 U.S.C. 154(b) by 1632 days.

(21) Appl. No.: 12/480,293

(22) Filed: Jun. 8, 2009

(65) Prior Publication Data

US 2010/0313230 A1    Dec. 9, 2010

(51) Int. Cl.
*H04L 12/26* (2006.01)
*H04L 29/06* (2006.01)
*H04L 12/24* (2006.01)

(52) U.S. Cl.
CPC ............ *H04L 43/50* (2013.01); *H04L 12/2697* (2013.01); *H04L 43/045* (2013.01); *H04L 65/4076* (2013.01); *H04L 41/509* (2013.01)

(58) Field of Classification Search
None
See application file for complete search history.

(56) References Cited

U.S. PATENT DOCUMENTS

| | | | |
|---|---|---|---|
| 7,886,332 B2* | 2/2011 | Aratani et al. | 725/151 |
| 2006/0034185 A1 | 2/2006 | Patzschke et al. | |
| 2006/0236342 A1* | 10/2006 | Kunkel et al. | 725/52 |
| 2007/0058043 A1* | 3/2007 | Thukral | 348/180 |
| 2007/0107034 A1* | 5/2007 | Gotwals | 725/129 |
| 2007/0133425 A1* | 6/2007 | Chappell | 370/250 |
| 2011/0099570 A1* | 4/2011 | Sadja et al. | 725/16 |
| 2012/0030458 A1* | 2/2012 | Park et al. | 713/2 |

FOREIGN PATENT DOCUMENTS

WO    2008/030069 A1    3/2008

OTHER PUBLICATIONS

Cable Television Labs, Inc, "Data-Over-Cable Service Interface Specifications, DOCSIS Set-top Gateway (DSG) Interface Specification, CM-SP-DSG-I10-070223", Feb. 23, 2007.*
Set-top gateway specification for transmission systems for interactive cable television services; J.128 (Nov. 2005), ITU-T Standard. International Telecommunication Union. Geneva ; CH. No. J.128 (Nov. 2005). Nov. 29, 2005. pp. 1-98. XP017465068. [retrieved on Jun. 6, 2006].

(Continued)

*Primary Examiner* — Dominic D Saltarelli
*Assistant Examiner* — Omar S Parra
(74) *Attorney, Agent, or Firm* — Banner & Witcoff, Ltd.

(57) ABSTRACT

A content delivery networked is monitored to verify operation of control channels for the delivery of content to a customer. Monitoring includes joining a connection with at least one control channel in the network, decoding content of a signal in the control channel, determining whether the decoded content complies with a pre-determined rule corresponding to content transmitted in the control channel, and producing a report indicating whether the decoded content is compliant with the rule. In addition, a graphical user interface (GUI) displays the status and results of testing the control channel. The GUI is configured to perform generating a display representing testing status of a plurality of DSG tunnels in a first frame and test results of the DSG tunnels in a second frame and providing details of a DSG tunnel test when selected by a user.

27 Claims, 13 Drawing Sheets

(56) References Cited

OTHER PUBLICATIONS

IPTV service requirements and framework for secondary distribution; J.700 ( Dec. 2007), ITU-T Standard. International Telecommunication Union. Geneva • CH. No. J.700 (Dec. 2007). Dec. 14, 2007. pp. 1-66. XP017435911. [retrieved on Dec. 5, 2008].

Extended European Search Report—EP 10165124.8—Mailing date: Aug. 12, 2013.

\* cited by examiner

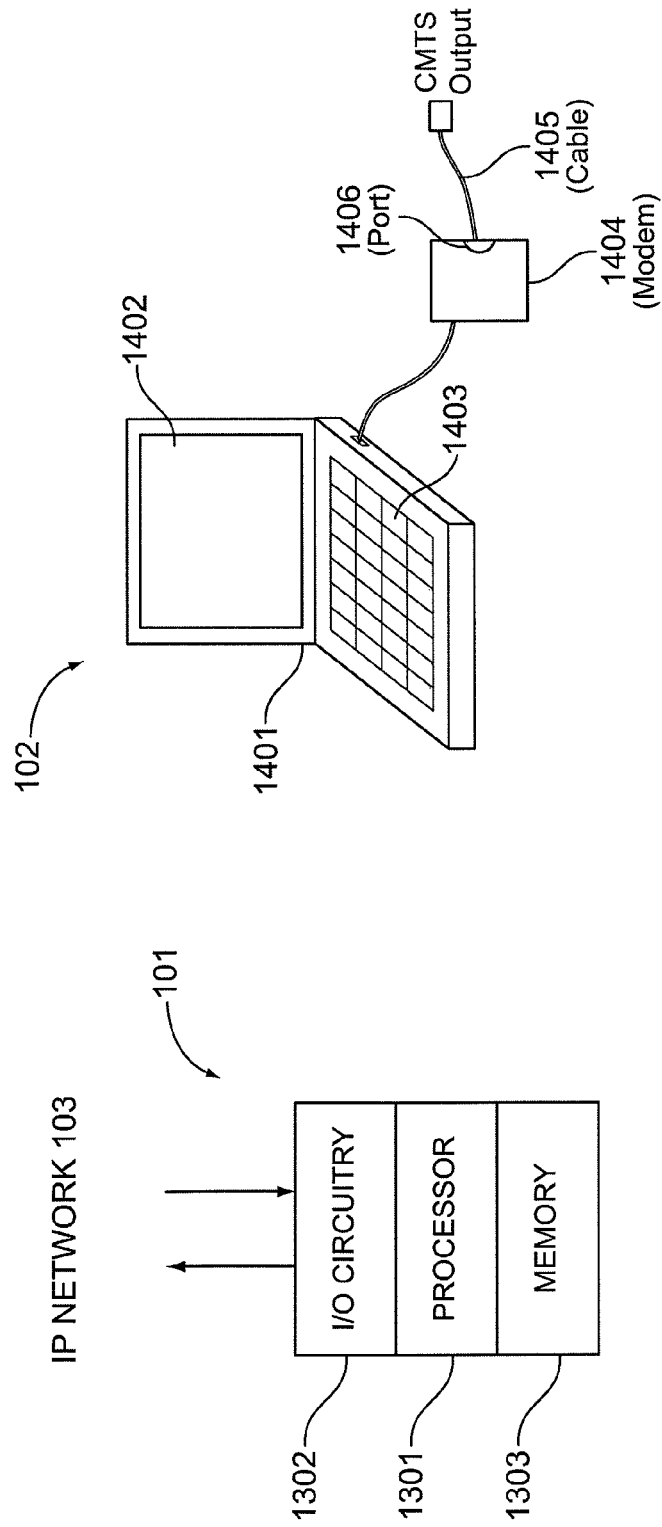

MONITORING A CONTENT-DELIVERY NETWORK

TECHNICAL FIELD

The present disclosure relates generally to testing a content-delivery system, and, more specifically, for testing a control channel in the content-delivery system.

BACKGROUND

Multiple System Operators (MSOs) are converging their video and data content-delivery networks (CDNs) to an all-digital converged network, allowing advanced services to be deployed, such as video on demand (VoD), switched digital video, on-line gaming and network based personal video recording (PVR) services. The ability to converge networks is due, in large part, to the OpenCable initiative for standardizing the operating systems of electronics that connect to the network, such as set top boxes (STBs), so that they could interact with the different CDNs. For STBs and video related services specifically, CableLabs®, a standards organization in the cable industry, published the OpenCable™ Applications Platform (OCAP), which addressed the problem of proprietary operating system software, and created a common platform on which interactive services may be deployed. OCAP has been adopted by the major MSOs and has been branded the Tru2way® specification.

As part of Tru2way specification, key changes were implemented that affect the command and control transport mechanism between the STB and the headend.

Specifically, CableLabs laid the groundwork for new interactive video services when it developed the DOCSIS Set-top Gateway (DSG) Interface Specification, which leverages DOCSIS standards-based equipment and introduces open, standards-based technology for video networks. This specification defines interface requirements for transport of a class of service known as "out-of-band (OOB) messaging" between network controllers, application servers, and customer premises equipment (CPE) such as residential gateways, televisions and STBs.

Prior to Tru2way standard, core STB technology remained primarily proprietary in nature. STB technology relied on the use of a dedicated "out-of band" or OOB channel to transmit control messaging from the headend to each STB. For example, conditional access (CA), system information (SI), electronic program guide (EPG), emergency alert system (EAS) and other STB command and control messages were sent via a downstream OOB radio frequency (RF) channel that was separate from the channels actually being watched. Specifically, an OOB gateway in the headend system received the content for the OOB channel over an IP/Ethernet connection from an application server, terminated the IP/Ethernet connection, and converted the content to ATM or MPEG-TS frames before passing the content down the OOB channel to the STB. Each OOB carrier typically required unique, proprietary headend equipment such as out-of-band modulators and return path demodulators.

Applicants identified a number of problems associated with a proprietary OOB channel. Besides requiring proprietary headend equipment to transmit/receive the signal as mentioned above, the proprietary nature of the OOB signal rendered it opaque and not subject to inspection and testing. Consequently, problems were usually realized only after a subscriber called to complain about service. Furthermore, even if one were able to penetrate the proprietary nature of the OOB signal and decode it, monitoring all the OOB signals across different plants was impractical because of all the different types of OOB signals used and the lack of connectivity between headends.

The DSG specification, however, moves away from traditional proprietary OOB transport to widespread, IP-based technology, while preserving the essential nature of current OOB transport. The control information is carried on an "always-on" control channel that is separate from the video delivery channel. Furthermore, DSG consolidates control traffic from the legacy video network onto the Converged Regional Area Network (CRAN) and DOCSIS networks. Applicant has identified that that this interoperability and consolidation of control traffic offers unique opportunities to monitor and test control channel signals.

BRIEF SUMMARY

One embodiment of the disclosure is a process of monitoring and testing a control channel in a content-delivery network. The process includes joining a connection with at least one control channel in the network, decoding content of a signal in the control channel, determining whether the decoded content complies with a pre-determined rule corresponding to content transmitted in the control channel, and producing a report indicating whether the decoded content is compliant with the rule. In another embodiment, the process further comprises identifying at least one network element associated with the decoded content and conducting at least one test transaction with the network element to verify its integrity.

Another embodiment of the disclosure is a tester for monitoring a control channel in a content-delivery network. In one particular embodiment, the tester includes a processor, input/output (I/O) circuitry operatively connected to the processor and configured for transmitting and receiving signals over a network, and memory operatively connected to the processor and configured with a program for instructing the processor to perform functions. Functions include joining to a connection with at least one control channel in the network, decoding content of a signal in the control channel, determining whether the decoded content complies with a pre-determined rule corresponding to content transmitted in the control channel, and generating a report indicating whether the decoded content is compliant with the rule.

Yet another embodiment of the disclosure is a graphical user interface (GUI) for displaying the status and results of testing a control channel of a content-delivery network. In one particular embodiment, the GUI is configured to perform generating a display representing testing status of a plurality of DSG tunnels in a first frame and test results of the DSG tunnels in a second frame and providing details of a test of a DSG tunnel when a user selects a test result of the DSG tunnel.

BRIEF DESCRIPTION OF THE DRAWINGS

FIG. 5 is a screenshot of a linear guide data details view of a tester connected to the IP network shown in FIG. 1.

FIG. 6 is a screenshot of the linear guide data.

FIG. 10 shows a screenshot of details of the EPG data in the Application tunnel.

FIG. 11 shows a screenshot of the channel map details in the Network tunnel.

FIG. 13 is a schematic of a tester for integration with the IP network.

FIG. 14 is a depiction of a tester used for connection to the RF network (output of a CMTS).

DETAILED DESCRIPTION

Figure 1:
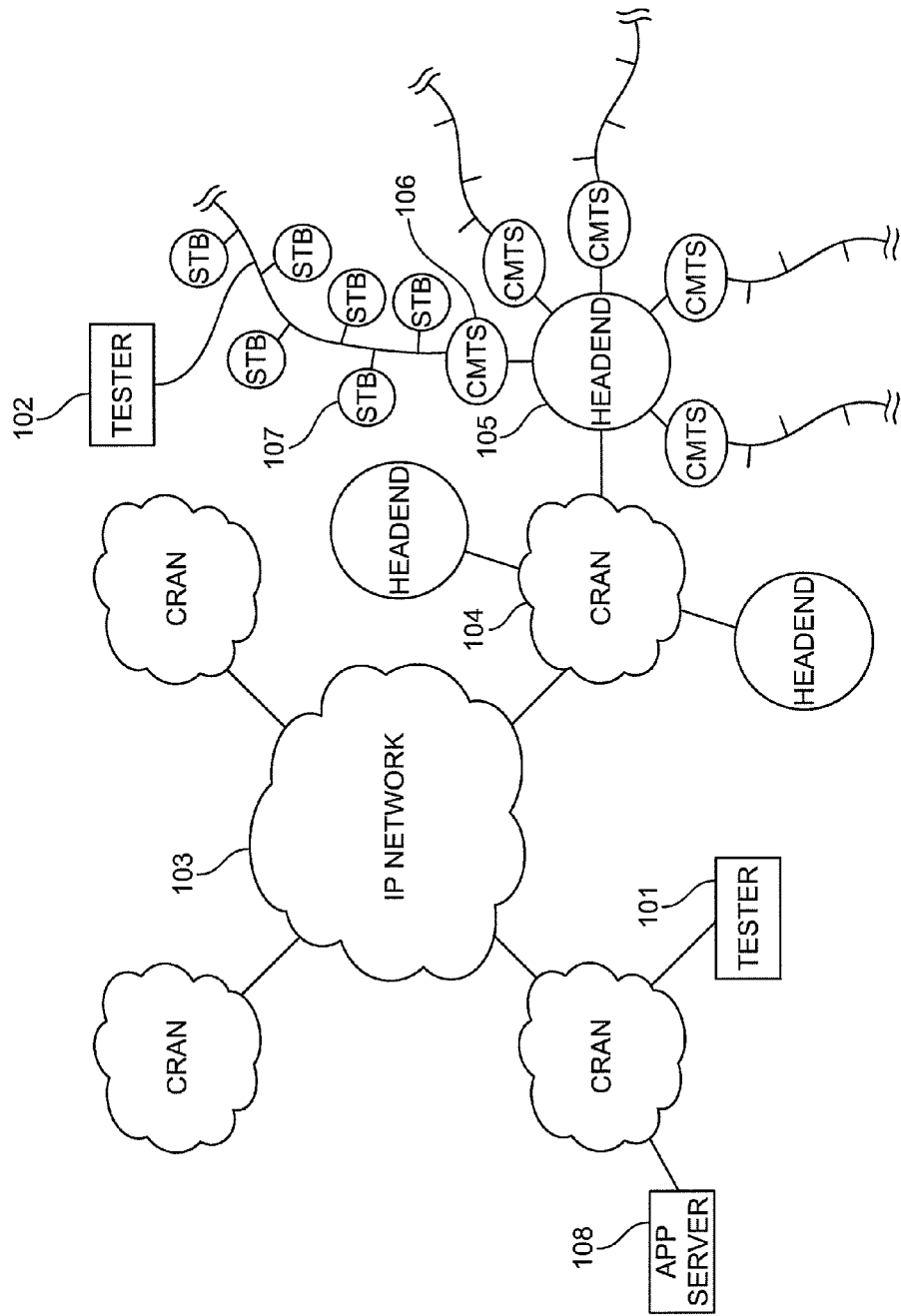
FIG. 1 is a schematic of one embodiment of a content delivery network having testers as disclosed herein.

FIG. 1 shows a schematic of one embodiment of a content-delivery network 100 incorporating the testing apparatus 101, 102 of the disclosure. Throughout this disclosure, reference is made to a cable system embodiment of the network 100; however, it should be understood the system and method of the disclosure are not limited to a cable system and may include any content-delivery network, e.g., Internet-based systems, wireless systems, and fiber-based systems. As used herein, a content delivery network or content distribution network ("CDN") is a system of computers networked together that cooperate to deliver content to end users or subscribers.

Referring to FIG. 1, the network 100 comprises an IP network (backbone) 103. IP network 103 may comprise a large collection of interconnected, high-capacity data routes and core routers. Networked to IP network 103 may be a plurality of subnetworks 104, which, in a cable system may include a Converged Regional Area Networks (CRAN), which typically, although not necessarily, service certain geographic regions. Each subnetwork (CRAN) 104 is associated with one or more edge router 106 for communicating with a plurality of clients 107 in the network 100. In a cable system the edge router 106 may be a cable modem termination system (CMTS) 106. CMTS 106 typically resides in a cable company's headend 105, or hubsite, and is used to provide high speed data services, such as cable internet or Voice over IP, to cable subscribers via a client device, such as a set top box (STB) or Cable Modem (CM). A given headend may have between half a dozen to a dozen or more CMTSs to service the cable modem population served by that headend or hybrid fiber cable (HFC) hub. On the subscriber side of the headend, CMTS 106 enables the communication with subscribers' cable modems. To this end, CMTS 106 functions not only to route signals to various clients (set top boxes) 107, but also to convert a signal used at the backbone 103 level to a form suitable for the clients. Specifically, the CMTS 106 interfaces Ethernet interfaces (connections) on one side and coax RF interfaces on the other side. The RF/coax interfaces carry RF signals to and from the subscriber's client device.

In a cable system, the client device is often referred to as a set top box (STB). A STB (e.g., set top box 107) refers to a device that connects to a monitor and an external source of signal, converting the signal into content for display/transmission over the monitor. The signal source might be an Ethernet cable, a satellite dish, a coaxial cable (cable television), a telephone line (including DSL connections), Broadband over Power Line, or even an ordinary VHF or UHF antenna. The STB may have several different embodiments. For example, it may be a special digital STB for delivering digital content on TV sets that do not have a built in digital tuner. The STB may also descramble premium cable channels. A STB may be a cable converter box to receive digital cable TV channels and convert them to analog for non-digital TVs. In the case of direct broadcast satellite (mini-dish) systems such as SES Astra, Dish Network, or DirecTV, the STB is an integrated receiver/decoder (or IRD). In internet packet (IP) TV networks, the STB is a small computer providing two-way communications on an IP network, and decoding the video streaming media that eliminates the need for any coaxial cabling. The STB may be a discrete unit or its functionality may be incorporated into other components of the user's system such as the monitor, TV, DVR, or personal computer. For example, the STB may be a portable, modular unit (i.e., a personal STB) or it may be integrated into a stationary TV system. The STB may contain one or more digital processors or may use the processing capabilities of the other system components (e.g., TV, DVR, personal computer). Additionally, rather than having its own tuner, the STB may use the tuner of a television (or DVR).

In one embodiment, the network 100 has DSG-enabled CMTSs (e.g., CMTS 106), thus allowing a DOCSIS CMTS to use the same control channel data used across different CMTS and even across CRANs (e.g., CRAN 104), thereby eliminating the need to deploy and manage unique stand-alone OOB systems. With a DSG-enabled CMTS, cable operators are now in a position to consolidate their video control and data traffic on control channels. More specifically, DSG leverages the existing infrastructure of digital video and DOCSIS networks to enable broadcast and interactive services required for control channel or OOB messaging transport. It should be understood that the term "out-of-band" or "OOB" is used herein generally to refer a control channel. It no longer means that the control channel is not within the same band as the video channel. Likewise, when referring to a "control channel" herein, a signal in the control channel may or may not be in the same band as the video channel.

The control channel interface between application servers 108 in the network 100 and the CMTS 106 may be, for example, IP Multicast or IP Unicast, although IP Multicast tends to provide a more efficient mechanism to distribute the same IP datagram to many CMTSs. The DSG configuration ensures that the IP Multicast or IP Unicast traffic is mapped over to appropriate "DSG tunnel," and in turn, to the desired set of STBs or to an individual STB.

The DSG tunnel is the one-way IP datagram transport mechanism over which a CMTS communicates to a STB. Examples of DSG tunnels include XAIT, Network tunnel (which delivers ChannelMap data), EMM tunnel (which delivers entitlement messages), OCAP app tunnel (which delivers partial guide data and guide configuration information), and *i*TiVo app tunnel (which delivers partial guide data and guide configuration information). With an embodiment, a conditional access or POD provider may be limited to eight DSG tunnels to transport OOB messaging, although this limitation may change as the system evolves. A DSG tunnel is carried over one or more downstream DOCSIS channels and is identified by the DCD Control message as defined in the DSG specification. In the Comcast case, the tunnel can also be identified by a well-known Ethernet media access control (MAC) address. When a DSG STB first boots during initialization, it scans the downstream for a QAM carrier. When QAM lock is achieved and if the DSG STB finds at least one DSG tunnel, it stays on the downstream. Tester 101 is located at IP network 103 of the content-delivery network, and tester 102 is located downstream of an edge router 106 in the network. Accordingly, in a cable network tester 101 is located at the IP network 103 and tester 102 is located downstream of a CMTS 106. Tester 101 is configured to test the control channel signals and network elements for the network 100 at large, while tester 102 is configured to test the control channel signals and network elements associated with a particular CMTS 106 downstream port. It should be understood that the claims are not limited to two testers situated as shown in FIG. 1, and may include only tester 101 or tester 102.

Tester 101 need not be centrally located in IP network 103 but may be located instead in a CRAN 104. In the latter embodiment, the tester 101 may be configured for testing only the CMTSs associated with a particular CRAN or it may be associated with networks to receive CMTS output from other CRANs. Likewise, while the tester 102 may be located at the subscriber's premises to test the control channel signal from the CMTS, it may be desirable in some circumstances to locate the tester 102 in the hub or headend with the CMTSs. This way, there is no need to enter a subscriber's premises to test the control signals outputted by a CMTS. Additionally, in one embodiment, the tester 102 is configured to "tap" into the output of multiple CMTSs, thereby enabling one tester to service multiple CMTSs.

Figure 2:
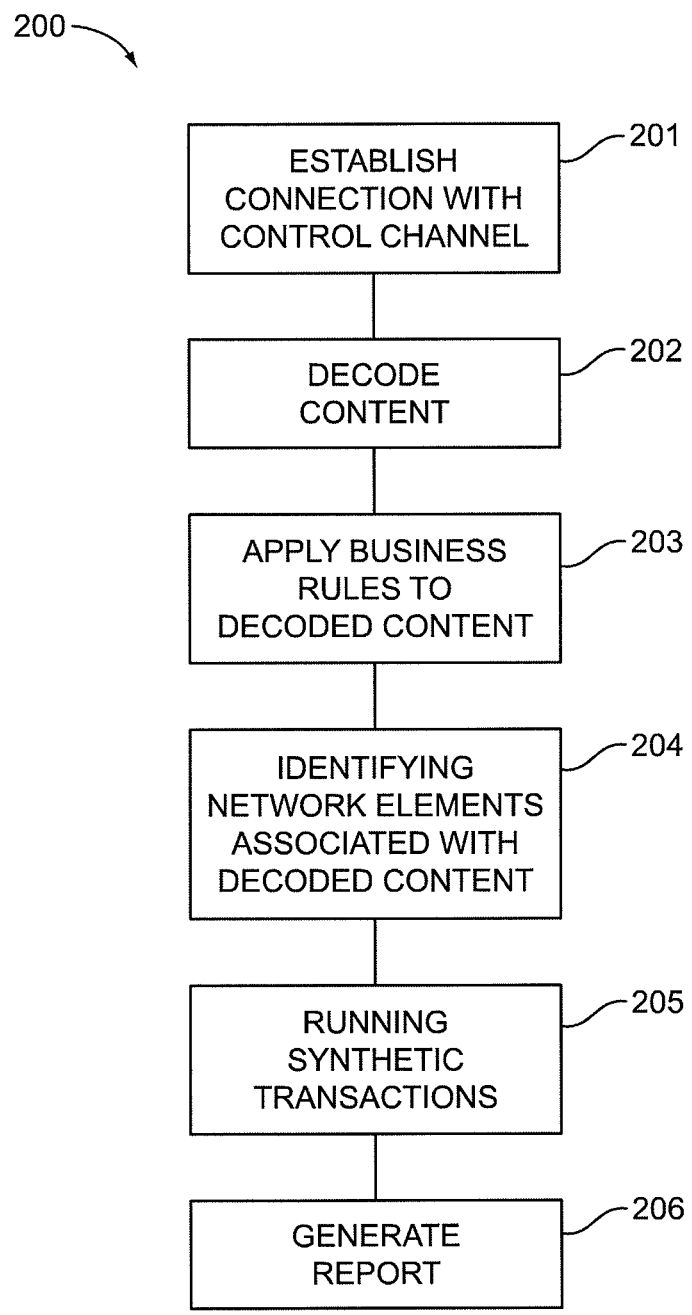
FIG. 2 is a flow chart of one embodiment of a method of monitoring and testing the control channel of a content delivery network shown in FIG. 1.

Testers 101, 102 function essentially as STBs as described above. They become virtual STBs, enabling not only detection of signals, but also testing of the network elements associated with the signals. More specifically, FIG. 2 shows a flow chart 200 of an embodiment.

In step 201, the tester joins a connection with the control channel. In a DSG embodiment, the tester joins the connection with at least one DSG tunnel by scanning the downstream channel for a DSG tunnel having a DSG tunnel MAC destination address equal to a particular DSG client MAC address. Unlike a STB, the particular DSG client MAC address is selectable in the tester 101, 102 to emulate a client or STB supported by a particular CMTS. Although reference is made to DSG tunnels, in this description, it should be understood that the disclosure herein is not limited to this embodiment, and includes joining a connection with any signal in any control channel, which may or may not be an out-of-band channel.

In the embodiment of tester 102, a connection to the signal is joined after it has been converted to RF by a CMTS. This is performed, for example, by configuring a regular cable modem or STB to forward the DSG signal to the Ethernet port, and connecting that Ethernet port to a laptop/computer that is running analysis software. Specifically, the cable modem may use a configuration file (e.g., ".cm" file) at boot up that instructs it forward the signal per the DOCSIS 2.0 Specification (i.e., Section C1.2.12—Multicast MAC Address150). This configuration may be targeted by the normal provisioning system on a per cable modem basis using the unique MAC address of the cable modem, thereby allowing the network provider to transform any cable modem that supports a specific protocol (e.g., Section C1.2.12—Multicast MAC Address150 of the DOCSIS 2.0 Specification) into a testing device. Thus, rather than developing a proprietary interface for the Tester 102 to connect to the network 100, it may use a modem already developed under the DOCSIS standard. With another embodiment, a Tru2way-compatible STB is loaded with software that forwards DSG data, 2-way data, and in-band data to the Ethernet port that is connected to a laptop/computer that is running analysis and control software.

In step 202 the content of the signal being transmitted in the DSG tunnel is decoded. Decoding content in the tester may be performed as it is in a STB using the same software/algorithms. For example, tester may use the same open standards protocols as STB to decode EPG data on CDN, VOD Asset Meta Data, or TiVo Experience (TE) Server data (TiVo only). The decoded signal may be used for a number of purposes, some of which are described below.

For example, in step 203, the tester applies business rules to the decoded signal to determine if the signal is compliant with the appropriate standards, protocols or rules (collectively referred to herein as "rules"). For example, signals transmitted in the following tunnels may tested against the rules as set forth below:

XAIT Tunnel
⇒ Rule: One message per second
⇒ Needs to match reference XAIT

Network Tunnel
⇒ Rule: Channel map contains correct ControllerID entry (0xACDD)
⇒ Rule: Channel map contains correct ChannelMapID entry (0xACDC)
⇒ Rule: Channel map contains correct TVW_OCAP entry (5000)
⇒ Rule: Channel map contains correct TVW_BKGD entry (5001)

Application Tunnel
⇒ Rule: lb.xml consistent with controllerID in channel-map
⇒ Rule: Entries present for and consistent for VOD session, VOD Nav, Imprint, EPG URL, SCM Other rules include, for example, determining if location of a network element associated with the decoded content is within an area served by a given video controller. The rules may be tailored to identify anticipated problems, e.g., common mistakes due to human error. As shown in FIG. 1, application server 108 may function as a video controller.

In addition to checking the compliance of the signal with certain rules, in step 204, the decoded content may be used to identify network elements associated with the signal. More specifically, the signals transmitted in various tunnels designate certain network elements available for providing services. For example, a configuration file on the Application tunnels provides the identity (IP address) of a VOD server for providing video assets. Network elements include, for example, VOD asset data server(s), VOD session resource manager(s), VOD Streaming frequencies, Click-stream logging/usage servers(s), Misc application server(s), EPG information servers(s), Video Provisioning servers (aka "video controller", or DAC for Moto, and DNCS for Cisco/SA), Code download servers, and Switched Digital Video (SDV) session resource manager(s). Still other network elements are possible and within the scope of the claims.

Once these network elements are identified, they may be checked in step 205. More specifically, because testers 101, 102 are active components on the network, they are able not only to identify a network element, but also to interact with it. Thus, the testers may conduct "synthetic" transactions with the network elements to verify their integrity. Verifying the integrity of a network elements may be performed, for example, by checking its data stream or its response to a stimulus. Examples of tests/transactions are provided below for the indicated data stream or network elements:

Linear Guide Data
⇒ Transaction: Periodically pulling full guide data sets for every ChannelMap from CDN
⇒ Transaction: Checking syntax, trap on error VOD Asset Metadata
⇒ Transaction: Periodically checking availability of VOD Main Menu
⇒ Transaction: Checking syntax, trap on error
TiVo Experience (TE) Servers
⇒ Transaction: Periodically checking availability of TE s
⇒ Transaction: Checking syntax, trap on error
Other synthetic transactions include, for example, checking of Imprint (Usage) servers and testing of Session Resource Managers for VOD or SDV.

Alternatively, the check for integrity may not be a transaction, but rather a verification of configuration. For example, for a video controller with id 2507, there should be a configuration file called "v1_2507_locationsxml" for the TVWorks Platform (TVP) OSL application to be able to function correctly. Still other checks and synthetic transactions are within the scope of this disclosure.

Figure 3:
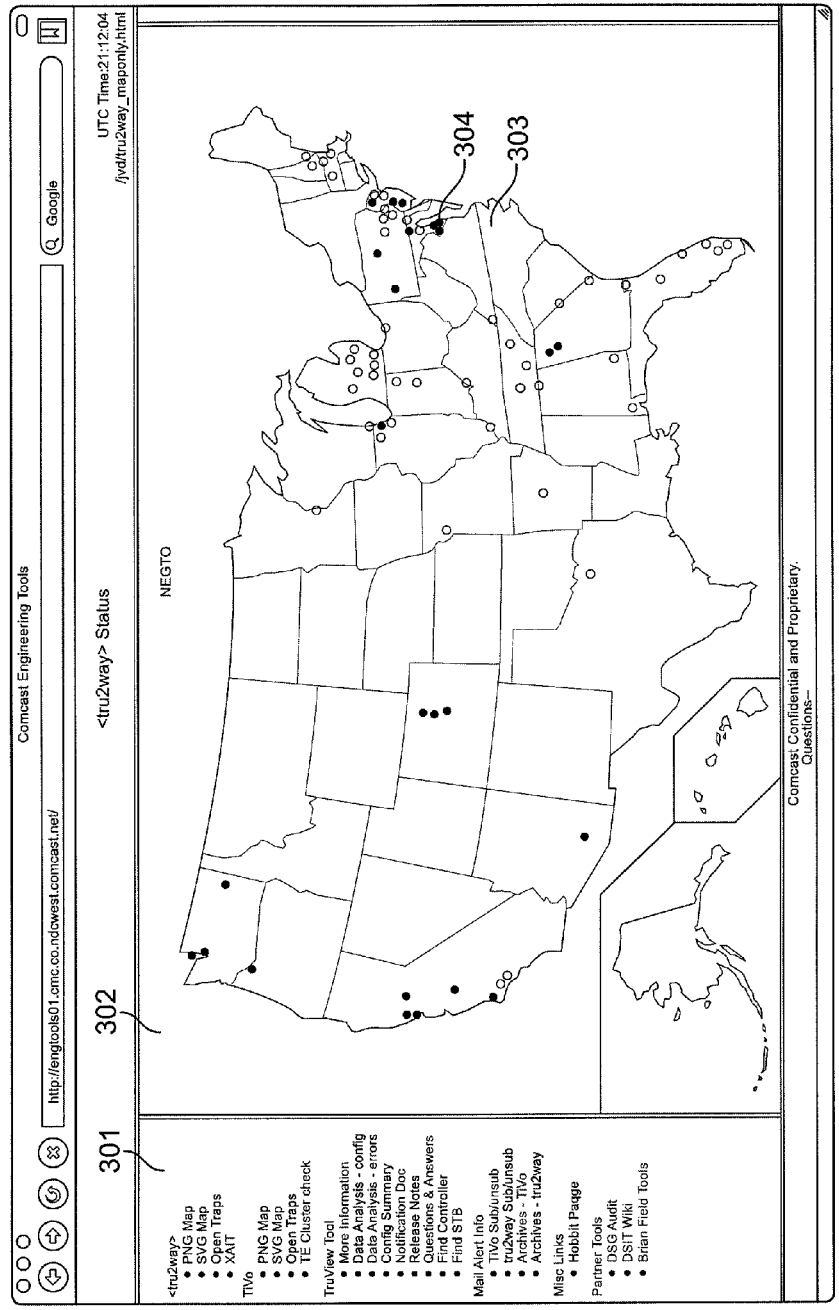
FIG. 3 is a screenshot of a main page of the display of a tester connected to the IP network shown in FIG. 1.

In one embodiment, the tester performs tests on one video controller's output and then switches to another video controller automatically so that the entire network is ultimately tested. For example, tester 101, which is integrated with the IP Network 103, has access to essentially all the DSG tunnels used in the network. Accordingly, in one embodiment, after it checks the compliance of signals and network elements associated with DSG tunnels for one video controller, it switches to another and reiterates the above-mentioned steps. Such a process allows the system to be constantly monitored and tested. With some embodiments, one process is executed per video controller so that there are, at any given time, N tunnels under inspection, where N equals the number of video controllers. With an embodiment, screenshot 300 (as shown in FIG. 3) displays the status for 63 controllers, 1703 DSG Tunnels, EPG data for 950 locations, and VOD asset metadata for 115 locations. Moreover, the screenshot 300 may show the status of a network as the network evolves.

On the other hand, tester 102, which is configured to connect to the output of CMTS 106, may not have access to the output of other video controllers or even other CMTSs. Furthermore, because the tester 102 may be on the subscriber's premises, it is generally desirable to keep the duration of the testing as short as possible. Accordingly, in one embodiment, tester 102 is configured to run certain tests just once and in a logical sequence to troubleshoot a problem. That is, in one embodiment, the tests start with the most likely causes of the experienced problem, and moves to less likely causes until the problem is identified.

After the various checks and transactions are performed, the results are converted into a human-understandable format, and provided in a report to an administrator of the control channel in step 206. As used herein, the administrator refers to anyone having any control or responsibility for the control channel, and may include, for example, administrators of the CDN, the MSO, technicians in the fields, and data collection systems. The information provided and the form in which it is provided may vary with the application. For example, tester 101, which resides on IP network 103, may provide information on a broader scale than tester 102, which resides on the output of a CMTS 106.

For example, referring to FIG. 3, a screenshot 300 of the main page of test 101 is shown. The left frame 301 determines what is shown in main frame 302. In this embodiment, the choices are Tru2way Map (which is the default), or TiVo Map. Right frame 302 displays a map 303 which is refreshed periodically, e.g., every five minutes. In one embodiment, each video controller is represented on the map by a color-coded indicator 304. The color of the indicator corresponds to the controller's status. For example, a green circle means the controller is "OK," a blue circle means that "Not all required Tru2way tunnels are configured," a yellow circle indicates "Warnings," a red circle indicates "Errors," and a gray circle indicates that "No Tru2way configuration on this controller." Still other status conditions and indicator types may be used.

Figure 4:
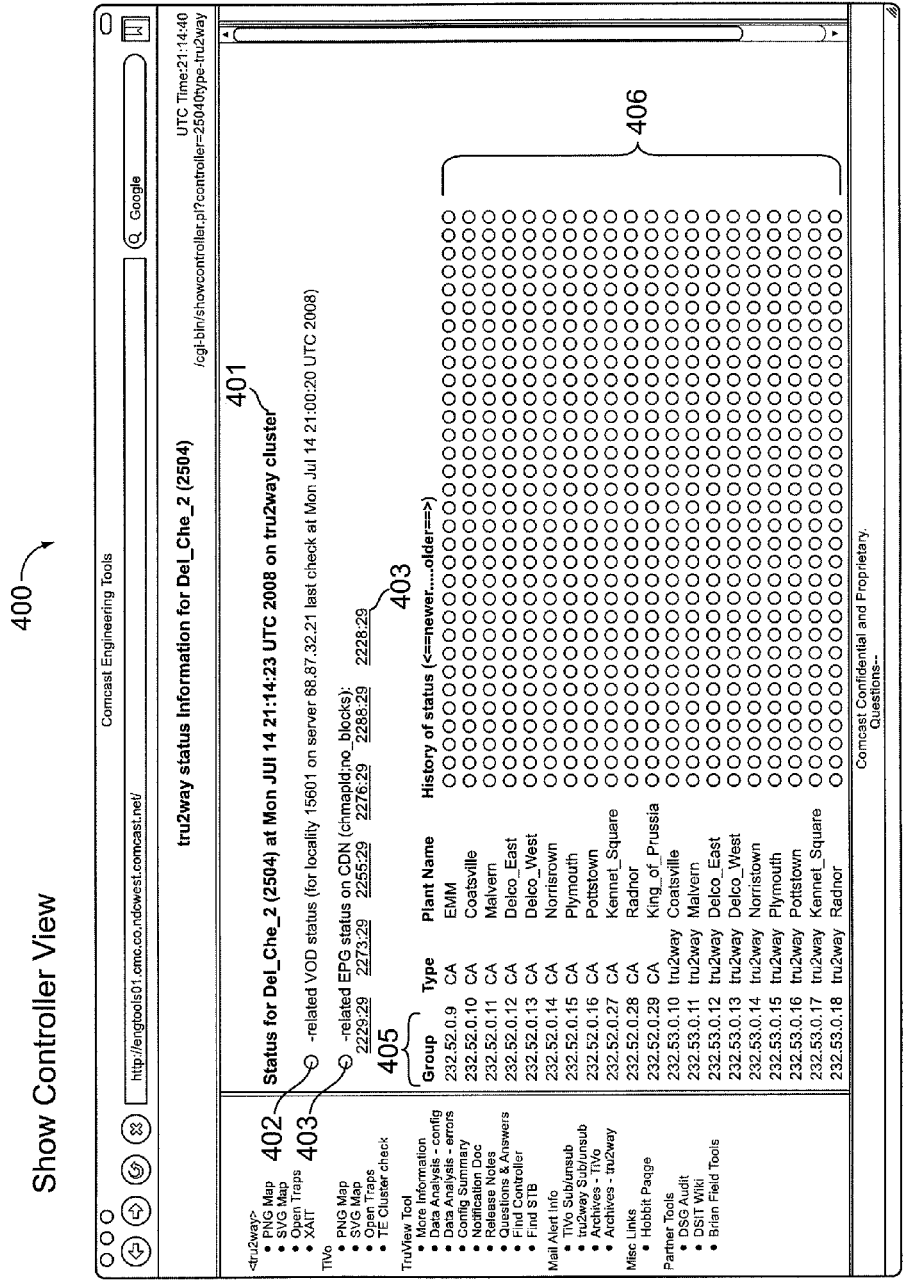
FIG. 4 is a screenshot of the controller view of a tester connected to the IP Network shown in FIG. 1
Figure 5:
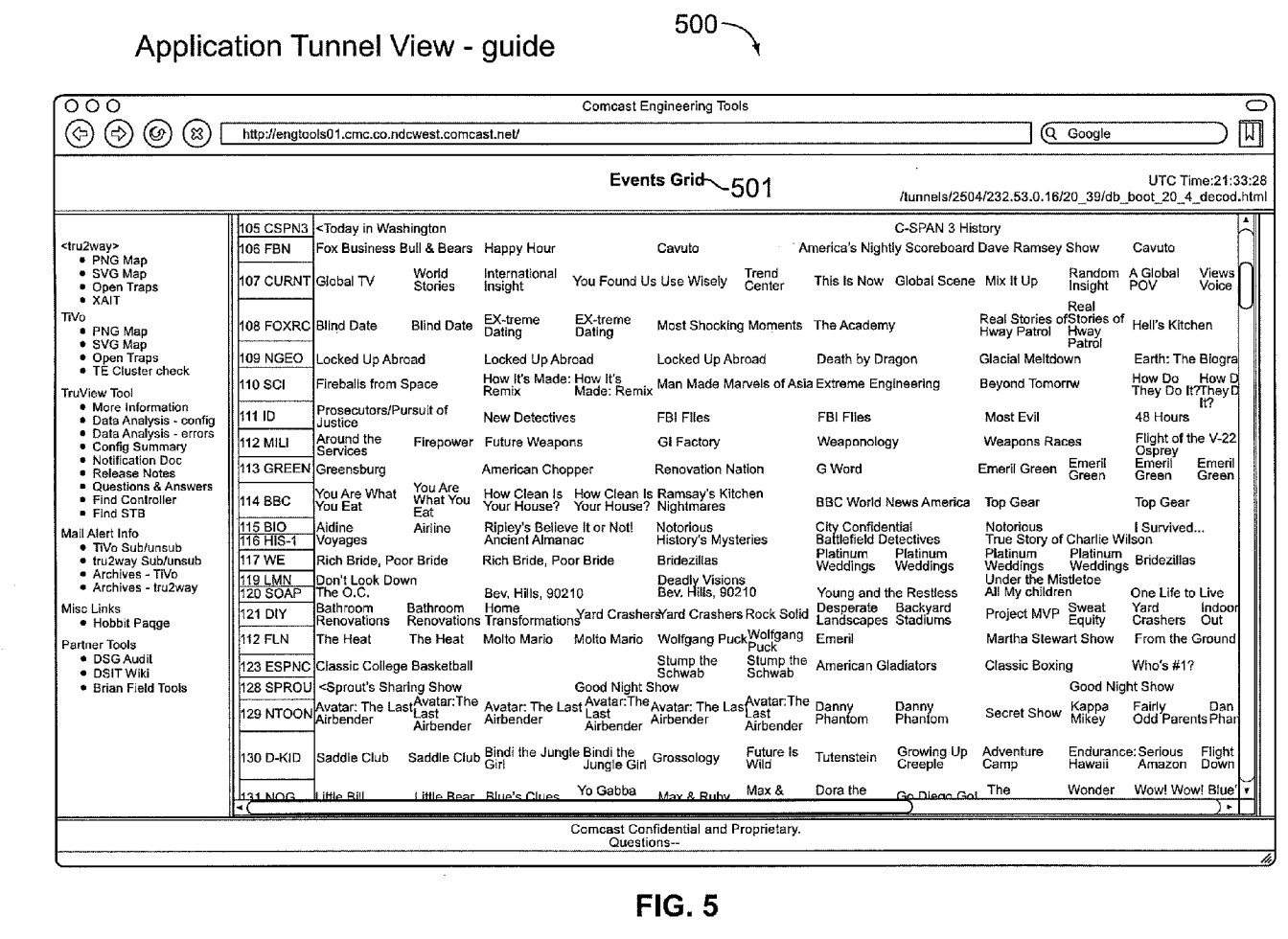
Figure 6:
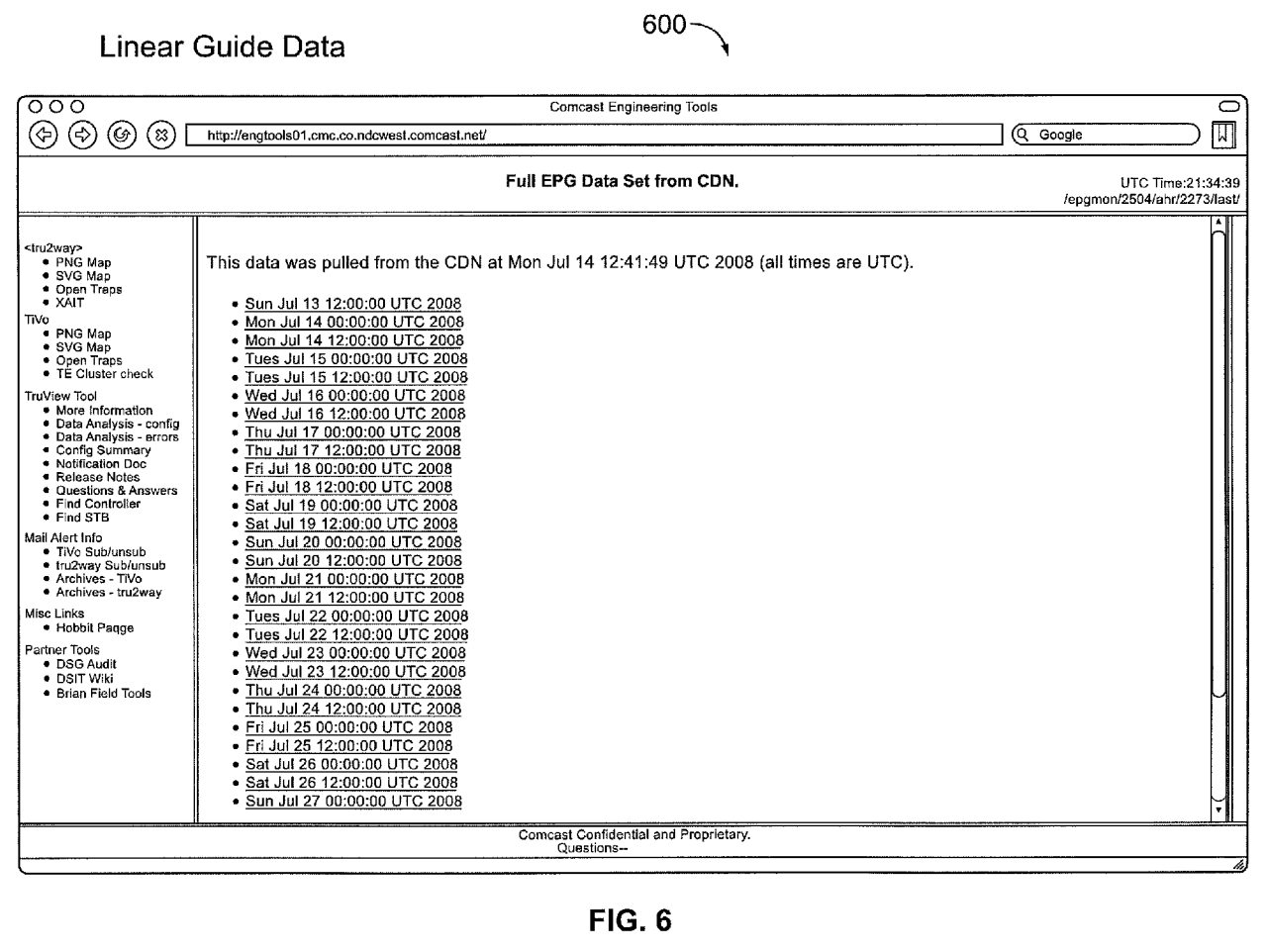

The user may click on any indicator in FIG. 3 to see the details of the test on the video controller as shown in FIG. 4. In this "controller view" screenshot 400, the VOD status and last check date/time are provided in frame 401. A user may browse VOD assets on VODNav server by clicking on the indicator 402 of the VODNav server. This itself may be a link to the EPG data pages. If in TiVo view, the TiVo Experience (TE) server status and last check date/time are provided. Tunnel status and history 406 (most recent is left) may also be provided to include, for example, the following tunnels: EMM, Network, Tru2way Application, TiVo Application. Clicking on any of these indicators 406 provides a detailed view for that tunnel at a particular sampling time. Referring to FIG. 5, a screenshot 500 of the application tunnel 407 is provided which provides an event grid 501 of channel and scheduled programming. As mentioned above, the testers may also perform synthetic transactions to test the integrity of network elements, and, in this respect, FIG. 6 is a screenshot 600 of linear guide data generated from pulling data from the CDN using HTTP.

FIGS. 7 through 12 are selected screenshots from tester 102. These screenshots of the tester 102 are related to those of test 101, but tailored to reflect the fact that, in one embodiment, the tester 102 is connected downstream of an CMTS. In one embodiment, the tester 102 comprises a graphical user interface (GUI) for displaying the status and results of testing a control channel of a content-delivery network. The GUI is configured to perform the following steps: generating a display representing testing status of a plurality of DSG tunnels in a first frame, and test results of the DSG tunnels in a second frame; and providing details of a test of a DSG tunnel when a user selects a test result of the DSG tunnel.

Figure 7:
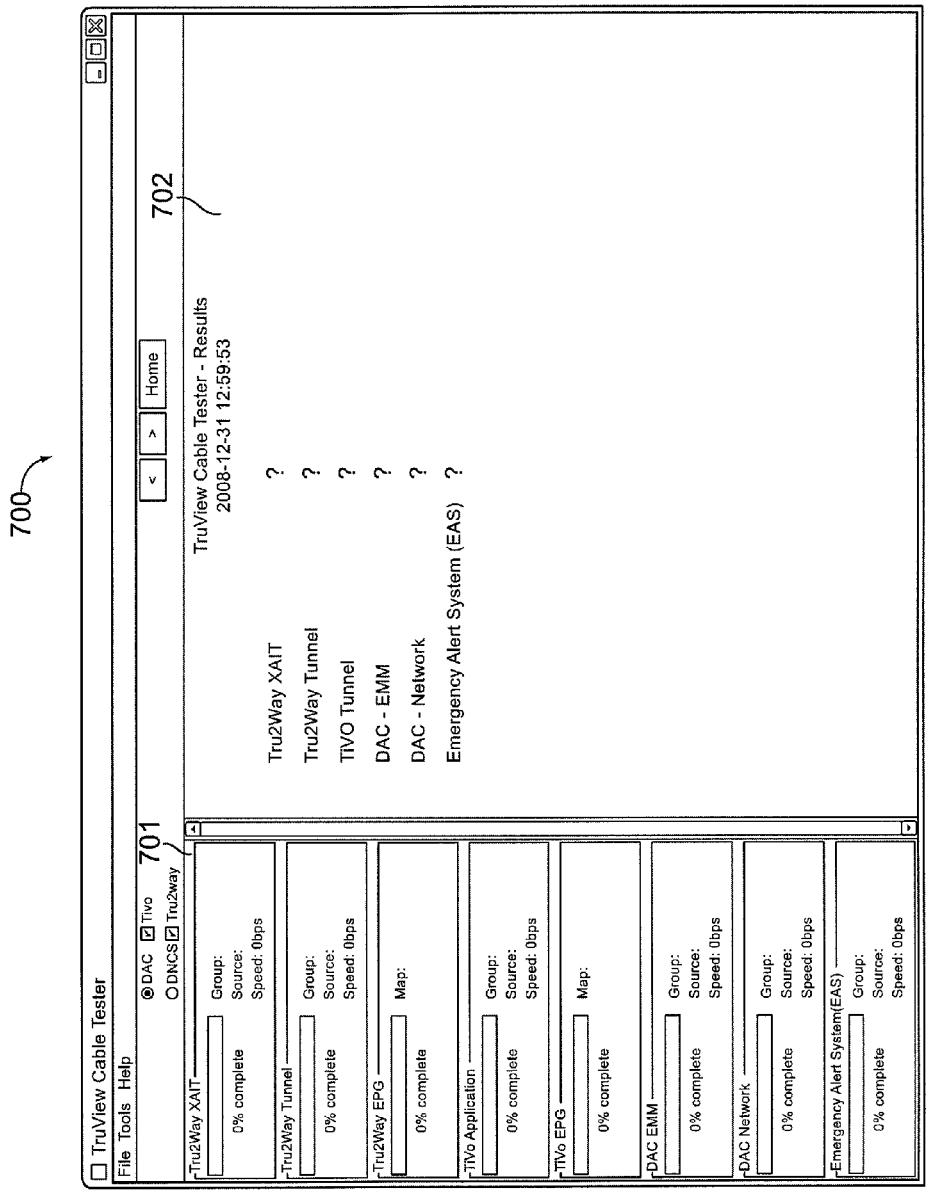
FIG. 7 is a screenshot of a homepage of a tester connected to the RF network (output of a cable modem termination system).
Figure 8:
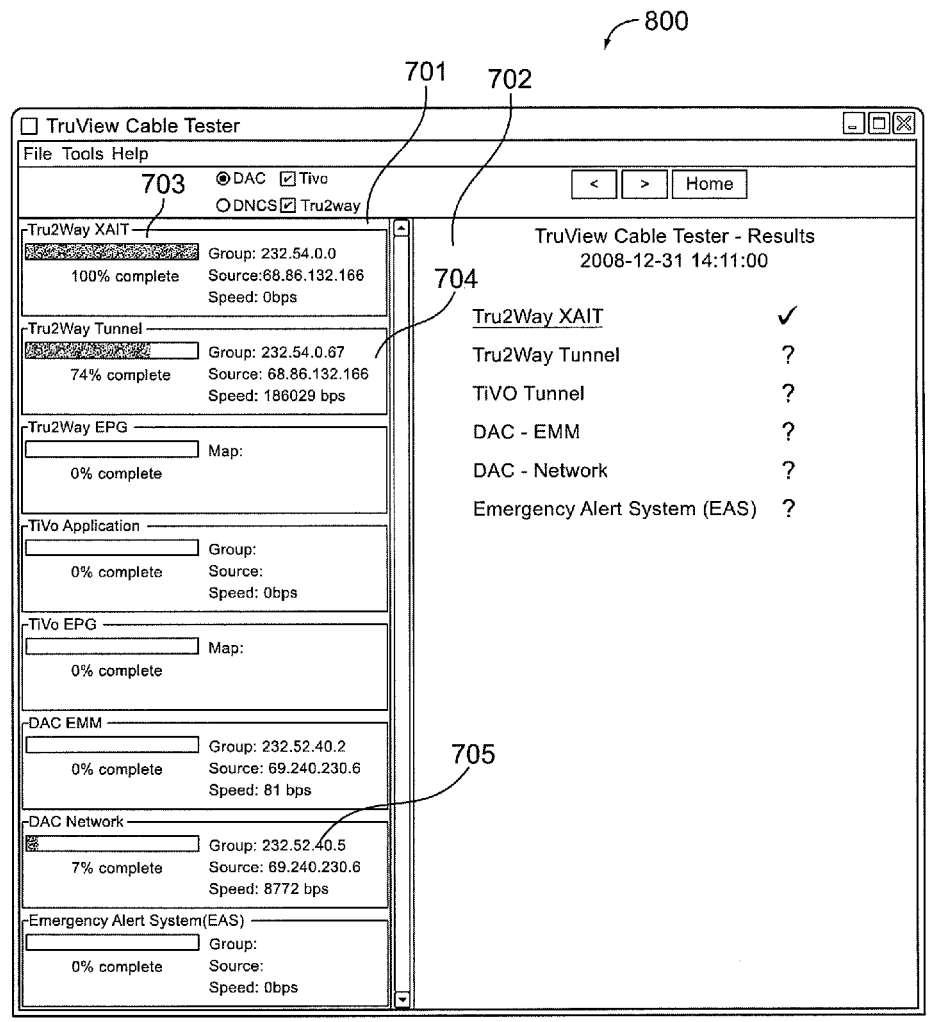
FIG. 8 shows a screenshot following the competition of the XAIT test tunnel and a partial decoding of the Tru2way tunnel.
Figure 9:
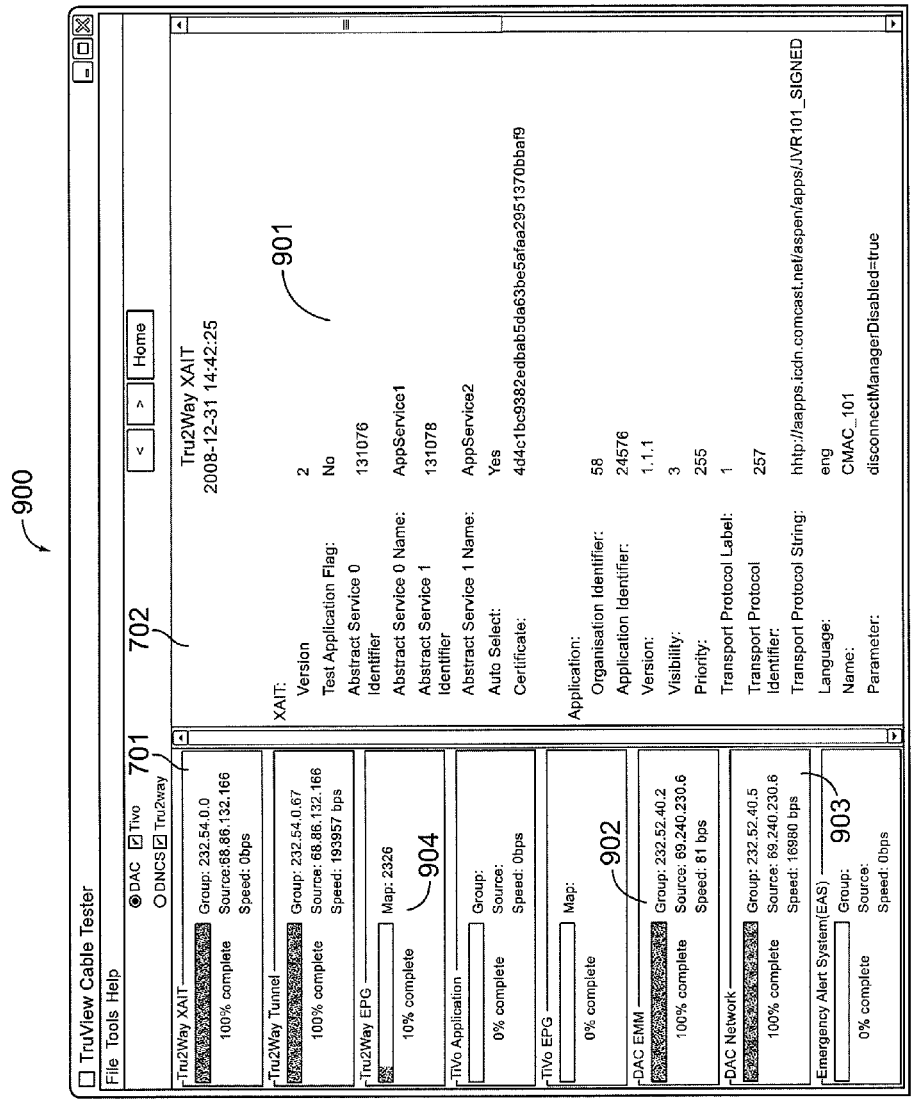
FIG. 9 shows a screenshot of details of the XAIT tunnel.
Figure 10:
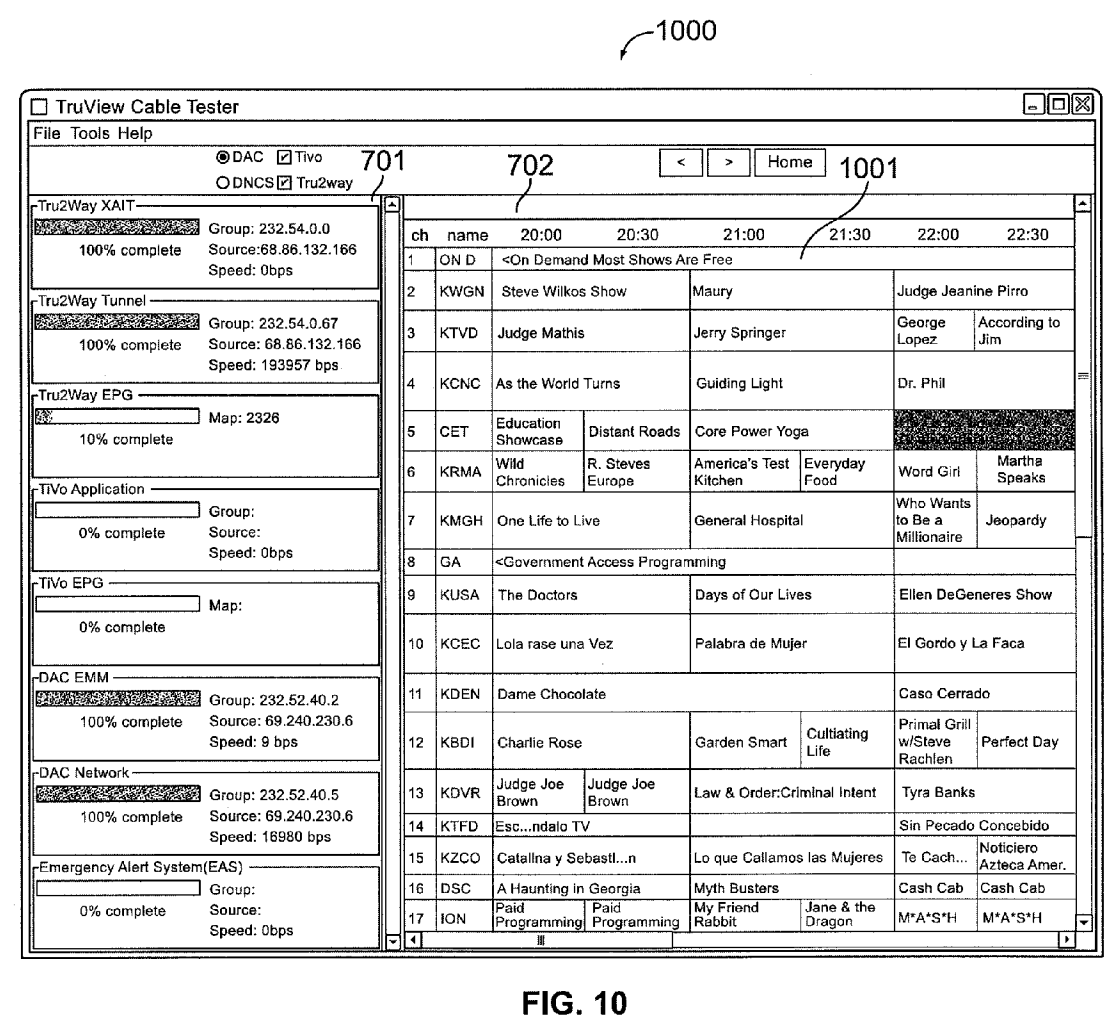
Figure 11:
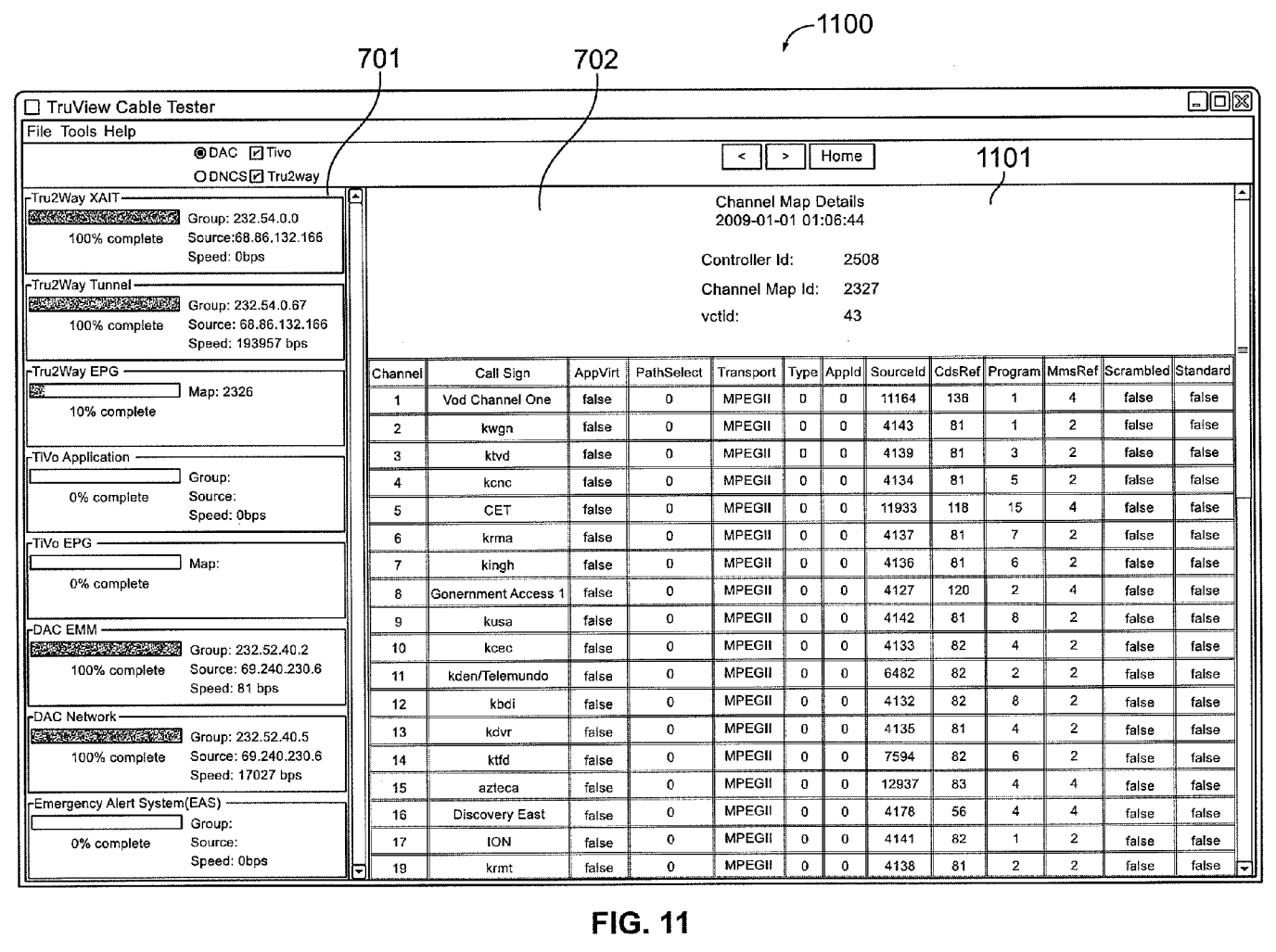
Figure 12:
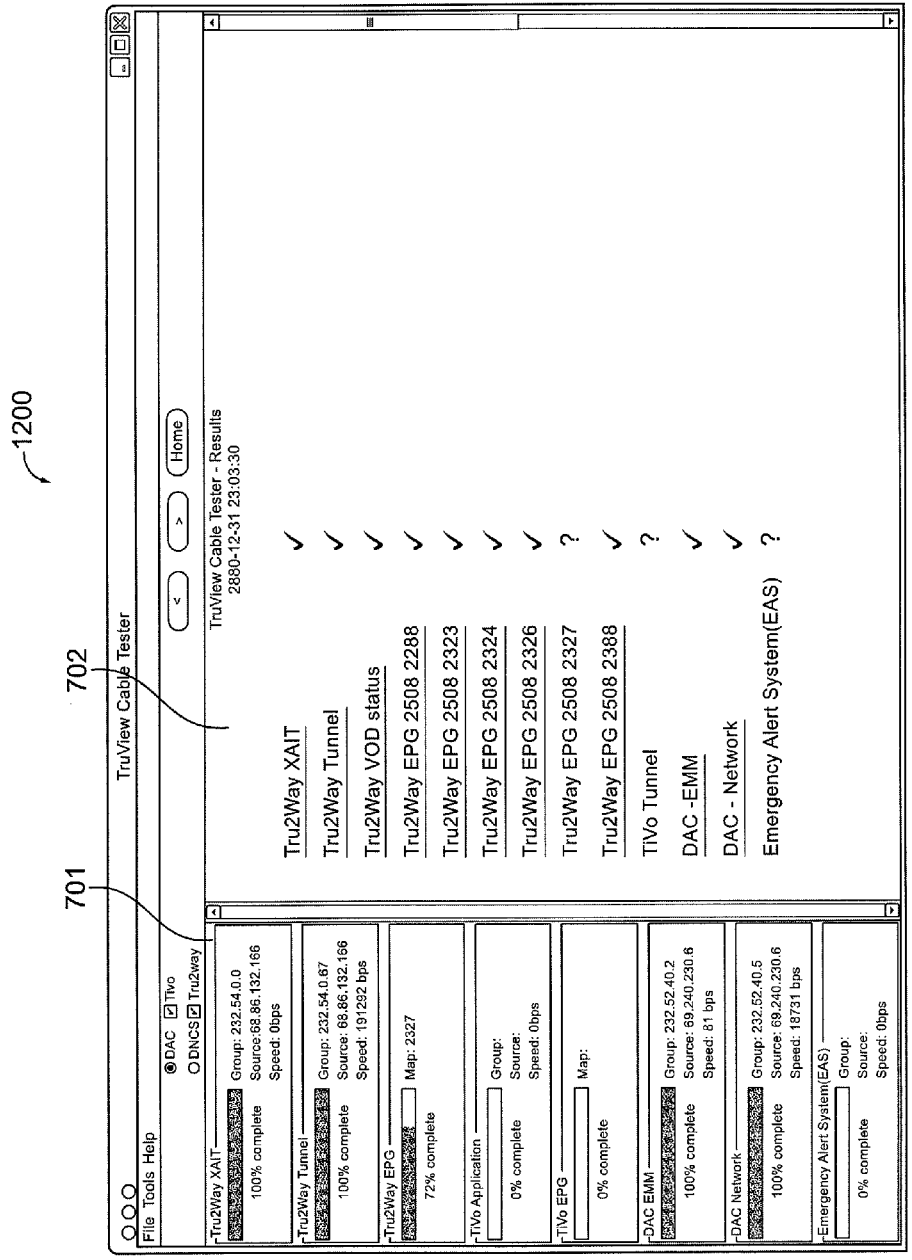
FIG. 12 shows a screenshot of the cable tester results partially completed.

For example, the screenshot 700 of FIG. 7 is the opening page before connection to the tunnels and decoding of the signals thereon occurs. The screenshot 700 has a left frame 701, which indicates the status of the testing performed on certain tunnels, and a right frame 702 indicating the results of the tests. In FIG. 8, the left frame 701 indicates that testing of XAIT tunnel 703 is complete, while testing of the Tru2way tunnel 704 and DAC network 705 are partially complete. The frame 702 to the right in the screenshot 800 of FIG. 8 shows results of the test and allows the user to drill down and see details of the test. For example, FIG. 9 is a screenshot 900 showing details 901 of the XAIT tunnel test in the right frame 702. This screenshot also shows in the left frame 701 that testing on the DAC EMM 902 and DAC network 903 tunnels are now completely decoded, while Tru2way EPG 904 is partially decoded. FIG. 10 shows a screenshot 1000 of the details 1001 of the Tru2way EPG tunnel test in which programming for the various channels are provided in an event table in the right frame 702. FIG. 11 shows a screenshot 1100 of additional details 1101 of the DAC Network in right frame 702, specifically, a channel map including source identification. FIG. 12 shows a screenshot 1200 indicating the left frame 701 that testing of the Tru2way XAIT, Tru2way EPG, DAC EMM, and DAC network tunnels is complete, and the results are satisfactory as shown in the right frame 702. It should be understood that, in addition to these screenshots, others following the decoding of the various tunnel signals are also possible.

In addition to or as alternative to screens and other user displays, testers 101, 102 may have a notification system for notifying administrators of video controllers and CMTSs of possible problems. For example, in one embodiment, notification is transmitted by implementing the management information base (MIB). This may involve, for example, one or more of the following messages that may not be standardized: cCastTunnelMissing, cCastTunnelDegraded, cCastVODserviceDegraded, cCastEPGdataMissing, cCastOCAPappFileError, and cCastTruViewServer. The testers may also be configured to send e-mail notifications, set and clear traps, or perform any other messaging to announce a problem.

The physical embodiment of the testers 101 and 102 may vary according to applications needs. In one embodiment, tester 101 is a server integrated with the IP network 103. A schematic of one such embodiment is provided in FIG. 13. As shown the tester 101 comprises a processor 1301, input/output (I/O) circuitry 1302 operatively connected to the processor 1301 and configured for transmitting and receiving signals over a network 100, and memory 1303 operatively connected to the processor. The memory is configured with a program for instructing the processor to execute, for example, the following functions: joining a connection with a control channel of the network via the I/O circuitry; decoding a signal in the control channel; checking if the decoded signal is compliant with one or more rules; identifying network elements associated with the decoded signal; performing synthetic transactions with the identified network elements to verify their integrity; and outputting reports on results of the checks and transactions as described above.

In one embodiment, the tester 102 is a portable computer such as a laptop or tablet computer that is suitable for being carried onto a subscriber's premises and connected to the network 100 at that point. Portable computers such as laptops and tablets are well known. Accordingly, as with most traditional portable computers, tester 102 as shown in FIG. 14 comprises a housing 1401 containing a processor (not shown), I/O circuitry (not shown) operatively connected to the processor, user interface operatively connected to the I/O circuitry, which, in this embodiment, includes a display 1402 and a keyboard 1403, and memory (not explicitly shown) operatively connected to the processor. Such computers are well known and include, for example, Linux, MAC and Windows-based units. The memory is loaded/configured with instructions for having the processor monitor and test the network as described above, for example, with respect to FIG. 2.

Processor 1301 (as shown in FIG. 13) or tester 102 (as shown in FIGS. 1 and 14) may execute computer executable instructions from a computer-readable medium, for example, memory 1303 in order perform a data transmission process (any or all of the testing processes described herein). Computer storage media may include volatile and nonvolatile, removable and non-removable media implemented in any method or technology for storage of information such as computer readable instructions, data structures, program modules or other data. Computer storage media include, but may not be limited to, random access memory (RAM), read only memory (ROM), electronically erasable programmable read only memory (EEPROM), flash memory or other memory technology, CD-ROM, digital versatile disks (DVD) or other optical disk storage, magnetic cassettes, magnetic tape, magnetic disk storage or other magnetic storage devices, or any other medium that can be used to store the desired information and that can be accessed by processor 1301. The executable instructions may carry out any or all of the method steps described herein.

With some embodiments, tester 102 may comprise a set-top box that is modified to support the functionality of tester 102.

Unlike tester 101, however, tester 102 also comprises a cable modem or STB 1404 operatively connected to the I/O circuitry. The cable modem or STB forwards control channel traffic (e.g., DSG tunnel traffic) to the processor to enable the processor to execute functions on the control channel signals similar to those described above with respect to the tester 101. In one embodiment, the program of tester 101 is run on tester 102 with a Java interface to enable it to run downstream of the CMTS.

In one embodiment, tester 102 is configured to be located on the premises of the subscriber and to interface directly with the cable termination of the premises. To facilitate connection to the cable termination, tester 102 may include a port 1406 (see FIG. 14), which facilitates connection to a cable 1405 to interface with the output of the CMTS. Such a port may be any known I/O port, including for example, a USB port, RJ-type port, or wireless-type port.

Rather than connecting to the cable termination at the subscriber's premises, it may be desirable to locate tester 102 in a central facility and periodically switch to different CMTS outputs services by the centralized facility. The centralized facility may be a headend, hub or CRAN. In such an embodiment, the portability of tester 102 is not as important as when it is moved among subscribers' premises. Accordingly, rather than a portable computer, tester 102 may be a stationary computer such as a work station or server. Such an embodiment may also include switching circuitry for tapping into outputs of different CMTSs.

In yet another embodiment, a subscriber's computer or STB may be used as tester 102. Specifically, an applet or similar software module may be downloaded from the network through the CMTS onto a subscriber's computer or STB connected to the CMTS. The software module then configures the subscriber's computer to performing the process described above with respect to FIG. 2. Thus, subscriber's own computer becomes the tester 102, forwarding the results to technical personal operating the network without the need for a technician to enter the subscriber's premises. Eliminating technician "house calls" not only reduces costs, but also minimizes subscriber inconvenience associated with scheduling and waiting for technicians.

Still other embodiments of the testers 101, 102 are possible in light of this disclosure.

What is claimed is:

1. A method, comprising:
    decoding, by at least one computing device, a signal received in at least one control channel common between a first network and a second network, wherein the first network serves a first geographic area and the second network serves a second geographic area different than the first geographic area;
    determining, by the at least one computing device, whether the decoded signal complies with a pre-determined rule, by determining whether a location of a network element indicated by the decoded signal is within the first geographic area served by the first network; and
    generating by the at least one computing device, data indicating whether the decoded content is compliant with the rule.

2. The method of claim 1, further comprising:
    conducting, by the at least one computing device, at least one transaction with the network element to verify its integrity, wherein the transaction includes periodically retrieving a full guide channel map from the network element.

3. The method of claim 2, wherein conducting the at least one transaction comprises checking availability of a video-on-demand main menu.

4. The method of claim 1, further comprising:
conducting, by the at least one computing device, at least one transaction with the network element to verify its integrity, wherein the transaction includes periodically determining an availability of the network element.

5. The method of claim 1, further comprising:
conducting, by the at least one computing device, at least one transaction with the network element to verify its integrity, wherein the transaction includes verifying a syntax of a response to the transaction.

6. The method of claim 1, further comprising generating an interactive geographic map that indicates, for each of a plurality of network elements in the first and second networks, whether each network element is compliant with the pre-determined rule.

7. The method of claim 6, wherein at least one of the network elements comprises a video-on-demand server and wherein information from the video-on-demand server is communicated to a device at a user location within the first geographic area served by the first network.

8. The method of claim 1, further comprising joining, by the at least one computing device, an IP multicast data stream that carries the at least one control channel and wherein the at least one control channel comprises a data over cable service interface specification (DOCSIS) set-top Gateway (DSG) tunnel.

9. The method of claim 1, further comprising determining, by the at least one computing device, whether the decoded signal complies with the pre-determined rule by determining whether a location of a network element indicated by the decoded signal is within the second geographic area served by the second network.

10. The method of claim 1, wherein the data comprises at least one of a webpage, a simple network management protocol (SNMP) trap, or an e-mail.

11. The method of claim 1, further comprising joining, by the at least one computing device, a connection comprising the at least one control channel, wherein the connection is made to before the signal is converted to an RF signal.

12. A method, comprising:
decoding, by at least one computing device, a signal received in at least one of a plurality of control channels common between a first network and a second network;
determining, by the at least one computing device, whether the decoded signal complies with a predetermined rule specifying a predetermined message frequency of the decoded signal; and
generating, by the at least one computing device, data indicating whether the decoded signal is compliant with the rule.

13. The method of claim 12, further comprising:
conducting, by the at least one computing device, at least one test transaction with the first network or the second network to verify its integrity.

14. The method of claim 13, wherein conducting the at least one transaction comprises pulling a full guide data set.

15. The method of claim 13, wherein conducting the at least one transaction comprises checking availability of a video-on-demand main menu.

16. The method of claim 12, wherein the signal comprises emergency alert system information.

17. The method of claim 12, wherein the at least one control channel comprises a data over cable service interface specification (DOCSIS) set-top Gateway (DSG) tunnel.

18. The method of claim 12, wherein the signal is received from a video-on-demand server.

19. The method of claim 12, further comprising joining, by the at least one computing device, an IP multicast data stream that carries the at least one control channel.

20. The method of claim 12, wherein the data comprises at least one of a webpage, a simple network management protocol (SNMP) trap, or an e-mail.

21. The method of claim 12, further comprising joining, by the at least one computing device, a connection comprising the at least one control channel, wherein said connection is made before the signal is converted to an RF signal.

22. A method, comprising:
decoding, by at least one computing device, a signal received in at least one control channel common between a first network and a second network, wherein each of the first network and the second network serve a different geographic area;
determining, by the at least one computing device, whether the decoded signal complies with a predetermined channel map; and
generating, by the at least one computing device, data indicating whether the decoded signal is compliant with the predetermined channel map.

23. The method of claim 22, further comprising:
conducting, by the at least one computing device, at least one transaction with a network element to verify its integrity, wherein the first network and the second network are different converged regional area networks.

24. The method of claim 23, wherein conducting the at least one transaction comprises retrieving a full guide data set.

25. The method of claim 23, wherein conducting the at least one transaction comprises checking availability of a video-on-demand main menu.

26. The method of claim 22, wherein the signal comprises program guide information.

27. The method of claim 22, further comprising joining, by the at least one computing device, an IP multicast data stream that carries the at least one control channel.

* * * * *